United States Patent

Gajewski et al.

[11] Patent Number: 5,627,509
[45] Date of Patent: May 6, 1997

[54] GLAZING UNIT SECURITY SYSTEM

[75] Inventors: Kenneth J. Gajewski, Woodhaven; Larry R. Lyke, Novi, both of Mich.

[73] Assignee: Ford Motor Company, Dearborn, Mich.

[21] Appl. No.: 294,852

[22] Filed: Aug. 29, 1994

[51] Int. Cl.⁶ .................................................. B60R 25/10
[52] U.S. Cl. .................. 340/426; 340/545; 340/428; 200/61.08; 52/171 R; 427/205
[58] Field of Search ........................... 340/550, 545, 340/590, 598, 426, 463; 200/61.08; 52/171; 427/205

[56] References Cited

U.S. PATENT DOCUMENTS

| | | | |
|---|---|---|---|
| 3,609,739 | 9/1971 | Walter | 340/550 |
| 3,863,250 | 1/1975 | McCluskey, Jr. | 340/550 |
| 4,230,918 | 10/1980 | Schroeder et al. | 200/61.62 |
| 4,796,002 | 1/1989 | Heidman | 340/428 |
| 4,804,946 | 2/1989 | Elkowitz | 340/550 |
| 4,878,044 | 10/1989 | Hickman | 340/550 |
| 4,999,608 | 3/1991 | Galomb | 340/550 |
| 5,005,020 | 4/1991 | Ogawa et al. | 343/713 |
| 5,114,756 | 5/1992 | Mirabeau et al. | 427/379 |
| 5,139,850 | 8/1992 | Clarke et al. | 428/192 |
| 5,198,723 | 3/1993 | Parker | 313/634 |

*Primary Examiner*—Thomas Mullen
*Assistant Examiner*—Daryl C. Pope
*Attorney, Agent, or Firm*—Lorraine S. Melotik; Roger L. May

[57] ABSTRACT

A glazing unit security system has an electrically conductive strip of polymeric material self-adhered to the surface of a tempered glass pane. Security means electrically connected to the conductive strip senses and responds to a loss of electrical continuity of the conductive strip. The conductive strip is non-self-integral, such that it would not survive with electrical continuity a fracture of the underlying glass panel. Since a fracture of the tempered glass panel will result in overall fracturing of the panel, it would cause loss of electrical continuity of the conductive strip. The security system further includes an alarm or other device responsive to a loss of electrical continuity of the conductive strip. When installed in a motor vehicle, the security system may include disabling means to prevent normal operation of the motor vehicle in response to loss of electrical continuity of a conductive strip.

13 Claims, 2 Drawing Sheets

GLAZING UNIT SECURITY SYSTEM

BACKGROUND OF THE INVENTION

Security systems are used for detecting breakage of a glass pane of a window. Such systems typically include means for detecting breakage of the glass and means for responding to such breakage. Complex electronic shock sensors have been suggested for detecting vibrations corresponding to glass breakage, such as in U.S. Pat. No. 3,863,250 to McCluskey, Jr. For use in a motor vehicle, such systems involve undesirably high costs in producing the shock sensor and attaching it to each glass pane in the vehicle.

Other systems have employed conductive coatings or strips forming a closed loop around the outer perimeter of a glass pane, such as in U.S. Pat. No. 3,609,739 to Walter. Such full perimeter strips, however, present appearance problems for motor vehicle windows and, in addition, present an unacceptable risk of accidental disruption of the electrical continuity of the strip by scratching or the like due to the extent to which it is exposed to view and unintended contact.

It is an object of the present invention to provide a motor vehicle glazing unit security system which is economical to produce in the context of motor vehicle assembly, has good aesthetic qualities, and provides good durability over prolonged use. Further objects of the invention will be apparent from the following disclosure.

SUMMARY OF THE INVENTION

In accordance with a first aspect of the invention a motor vehicle is provided with a glazing unit security system wherein tempered glass panes, including multiple panes having an adjustable position, such as a door window, has a frangible or non-elastomeric electrically conductive strip self-adhered to the glass proximate a single peripheral edge. The conductive strip is located on an area of the glass pane which is hidden from view and, hence, from accidental damage due to contact in the course of normal use of the motor vehicle. The conductive strip is formed of a frangible cured polymeric material, such as conductive epoxy, self-adhered to the surface of the glass pane. Breakage of the tempered glass pane will result typically in overall shattering and consequent loss of electrical continuity of the frangible conductive strip. The conductive strip on movable door windows typically is located below the so-called "belt-line" of the vehicle door, such that it would be hidden from view and protected from inadvertent contact even when the glass pane of the door window is in its closed position.

It is an important aspect of the invention that the conductive strip be formed of material which, when cured, is self-adhered to the glass pane, but is non-elastomeric or frangible, i.e. provides insufficient structural integrity to maintain electrical continuity upon shattering of the underlying glass pane. Well known metallized glass strips attached by an adhesive to sheet glass is unsuitable for the present invention in view of its structural durability. The vehicle windows frequently comprise laminated structures wherein the outer glass pane is laminated to a PVB or other resilient ply. Thus, upon shattering, the glass underlying the conductive strip may remain substantially in place adhered to the resilient ply. Unlike the aforesaid well known metal tape strips, a conductive strip in accordance with the present invention would lose electrical continuity upon shattering of the underlying glass due to its frangibility. This is an especially critical feature of the present invention since the conductive strip does not extend along the entire circumference of the glass pane for reasons discussed above, including the aesthetic and durability problems of such designs. Thus, breakage of a vehicle glass pane at a location remote from the conductive strip may result in shattering, but only minor displacement of the glass underlying the conductive strip. The frangibility of the conductive strip ensures that even such minor displacement of the underlying glass will result in a loss of electrical continuity of the conductive strip.

The conductive strips for the various glass panes of the motor vehicle glazing units are electrically connected to security means for responding to a loss of electrical continuity of any of the conductive strips. The conductive strips may be connected to each other in electrical series or in other suitable fashion. The security means may respond to a loss of electrical continuity by audible and/or visible alarm. Preferably the security means is adapted to disable normal operation of the motor vehicle in response to loss of electrical continuity of any conductive strip.

In accordance of another aspect of the invention, a method is provided for producing a motor vehicle glazing unit security system, comprising applying a strip of electrically conductive curable polymeric material proximate a single peripheral edge of each of multiple tempered glass panes, followed by curing the polymeric material to form the frangible, electrically conductive strip self-adhered to the surface of the glass pane.

Additional features and advantages of the present invention will be apparent from the following detailed description of certain preferred embodiments in the invention.

BRIEF DESCRIPTION OF THE DRAWINGS

Preferred embodiments of the invention are discussed below with reference to the accompanying drawings in which.

DETAILED DESCRIPTION OF CERTAIN PREFERRED EMBODIMENTS

Figure 1:
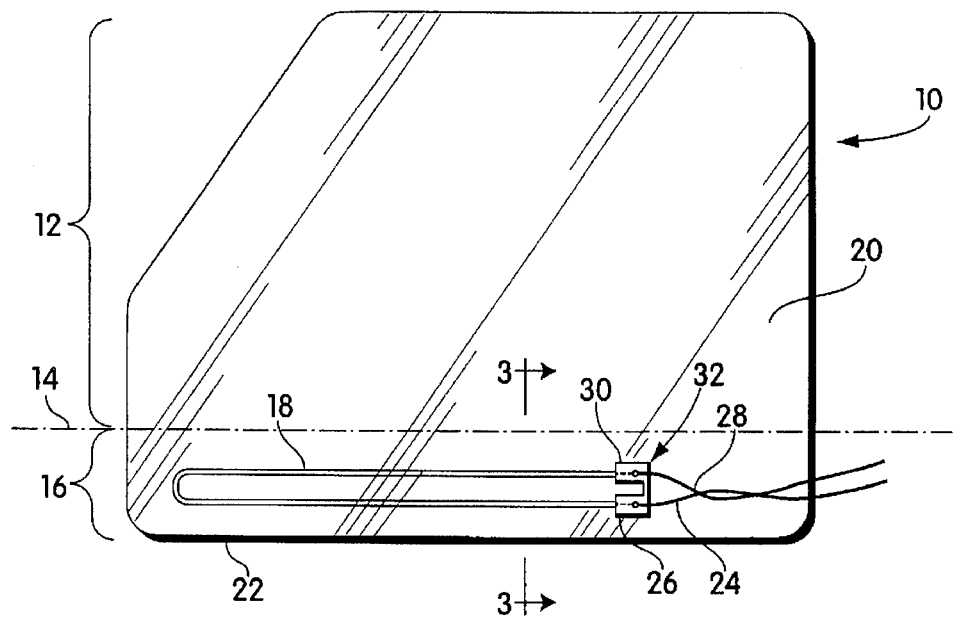
FIG. 1 is a schematic front elevation view of a tempered glass pane for a window in a motor vehicle door, carrying a conductive bus bar or strip below the belt line in accordance with a preferred embodiment of the invention.
Figure 2:
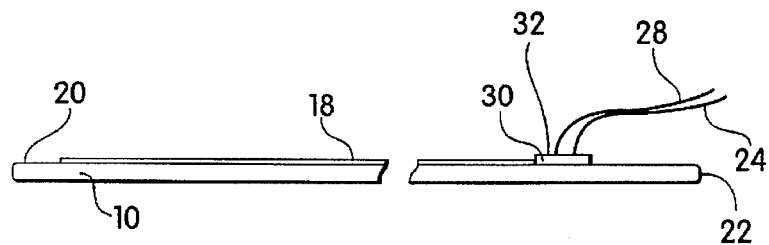
FIG. 2 is a side elevation view of the glass pane and conductive strip illustrated in FIG. 1.
Figure 3:
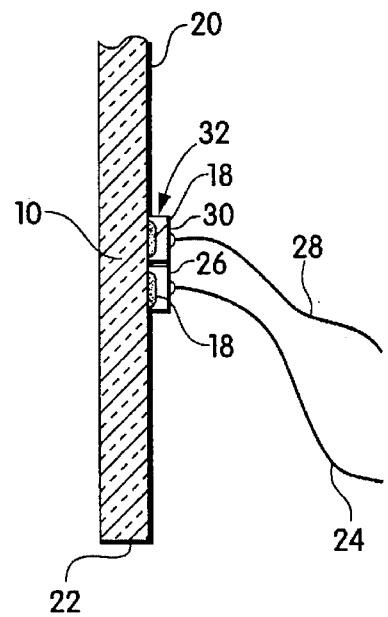
FIG. 3 is a second cross-sectional view of the embodiment of FIG. 1, taken through line 3—3 of FIG. 1.

The position of tempered glass panel 10 as a motor vehicle door window schematically illustrated in FIGS. 1–3, when installed, would be adjustable between a closed or full up position and an open or down position. Even in its full up position, however, only an upper portion of the glass pane would be exposed to view, since it has a greater vertical dimension than the window opening in the door. More specifically, portion 12 of the glass would be above the belt line 14 when the glass pane is in its closed position. Portion 16 would be below the belt line 14 and, so, would never be exposed to view in normal use of the window.

Conductive strip 18 is provided on surface 20 of glass pane 10. The conductive strip is applied to the surface of the glass as a curable polymeric material, such as a conductive ink or conductive epoxy or the like. Numerous suitable materials for forming the conductive strip are commercially available and will be apparent to those skilled in the art in view of this disclosure. Suitable conductive inks are available, for example, from Toranaga Technologies, Inc. including Ormet 2005 conductive ink. This conductive ink is applied as a liquid, for example by a roller travelling on the surface of the glass pane along the intended path of the conductive strip, by a silk screening or other application process, directly onto the surface of the glass pane. It is then dried for roughly one half hour at approximately 80° C., followed by vapor cure for two minutes or more at approximately 215° C., followed by post-curing for one hour at 175° C. Without wishing to be bound by theory, it is understood that the curing of such conductive inks involves a combination of metal sintering and polymerization. The ink consists principally of a mixture of fine metal powders, primarily copper, polymeric reactants and solvents. Once cured, it is an electrically conductive, frangible strip self-adhered to the surface of the glass.

As stated above, the conductive strip in certain preferred embodiments of the invention is formed of conductive epoxy which is applied to the surface of the glass as a curable polymeric fluid or paste, for example, by a roller or as a bead of material fed under pressure from a feed nozzle moved either manually or automatically over the surface of the glass in the pattern desired for the finished conductive strip. Various conductive epoxies are known to those skilled in the art and the curing procedure will depend upon the conductive epoxy selected including, for example, self-curing at ambient conditions, exposure to UV or other actinic radiation, thermal curing by exposure to elevated temperatures and the like. Suitable conductive epoxy material is disclosed in U.S. Pat. No. 5,114,756 to Mirabeau. Alternative suitable conductive epoxies are commercially available and will be apparent to those skilled in the art in view of this disclosure.

As seen in FIGS. 1–3, electrically conductive strip 18 preferably is provided in a U-shaped path proximate a lower peripheral edge of the glass pane. In accordance with a significant advantage of the invention, the conductive strip need only extend along a single peripheral edge of the glass, peripheral edge 22 in the embodiment of FIGS. 1–4, since tempered glass undergoes overall shattering upon sustaining a significant fracture anywhere in the expanse of the pane.

In accordance with particularly preferred embodiments, the conductive strip is provided in a U-shaped path, such that two terminal ends are proximate one another. Particularly in a motor vehicle assembly context, having both termini of the conductive strip proximate each other facilitates installation and wiring of the glazing unit security system. Thus, electrical lead 24 is seen in FIGS. 1–3 to be connected to a first terminus 26 of conductive strip 18, and second electrical lead 28 is seen connected to second terminus 30 of the conductive strip 18. Electrical leads 24 and 28 preferably are provided pre-assembled to a connector 32, which most preferably is placed in electrical contact with the conductive strip 18 prior to curing the polymeric material thereof.

Figure 4:
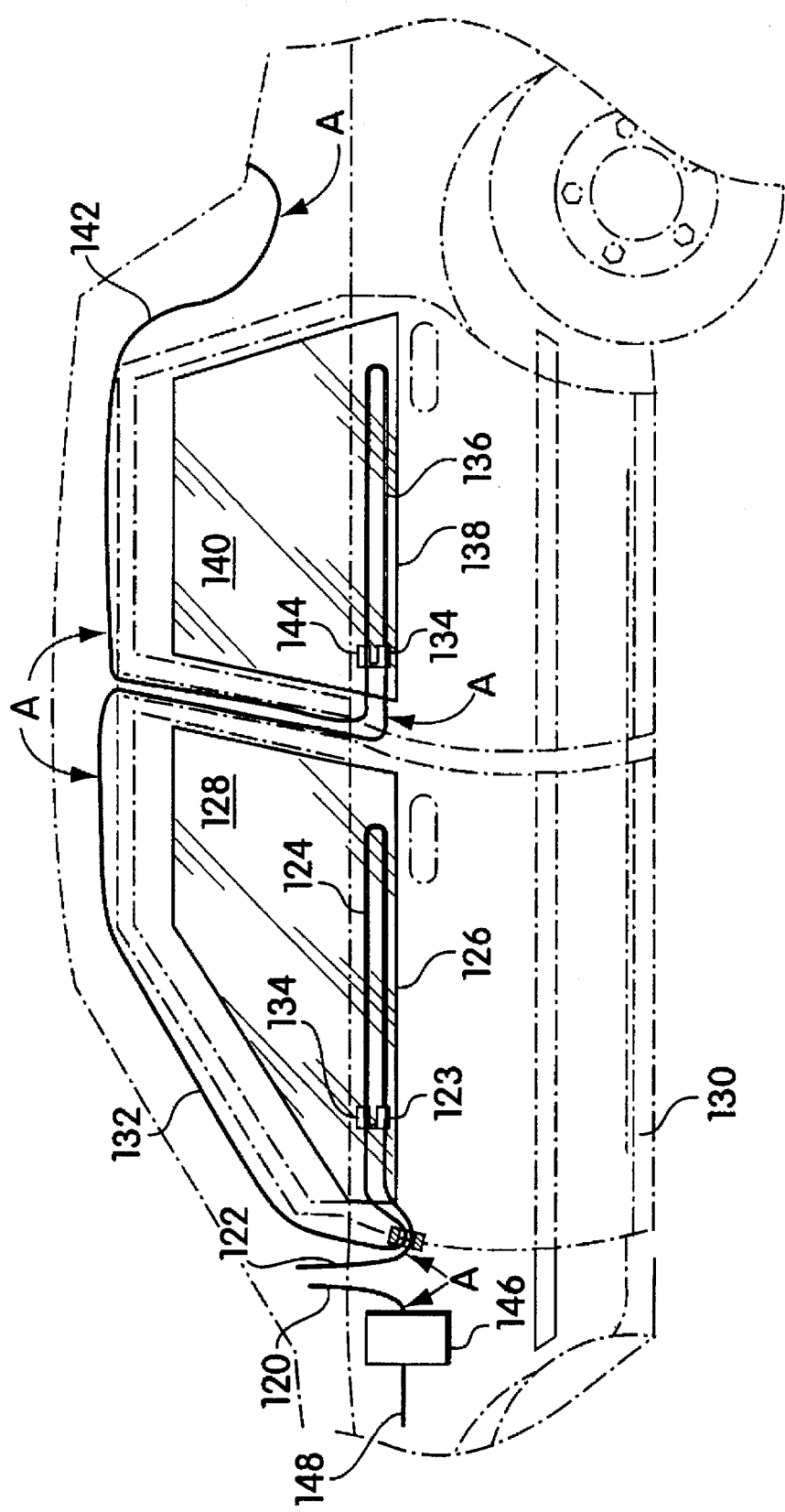
FIG. 4 is a schematic perspective view of a motor vehicle glazing unit security system in accordance with a preferred embodiment of the invention.

Referring now to FIG. 4, it can be seen that electrical leads 120 and 122 from the first and second termini, respectively, of a conductive strip in accordance with the invention, provided proximate the lower peripheral edge of the vehicle windshield (not shown) forms part of a series electrical connection with the electrically conductive strips of other windows in the security system. Specifically, electrical lead 122 is seen to be in electrical connection with a first terminus 123 of conductive strip 124 provided in a U-shaped path proximate the lower peripheral edge 126 of adjustable position window 128 in front passenger door 130 of the vehicle. Electrical lead 132 extends from the second terminus 134 of conductive strip 124. Second terminus 134 is seen to be located close to first terminus 123, facilitating use of a single wiring bundle to the conductive strip at the front of door 130. Electrical lead 132 extends within the vehicle body over the top of door 130 to establish series electrical connection at terminus 135 with a third conductive strip 136 extending along the lower peripheral edge 138 of rear passenger door window 140. It can be seen in FIG. 4 that windows 128 and 140 are slightly lowered from their full up position. It can be seen further that even in their full up position, the conductive strips 124 and 136 would not be visible and would not normally be exposed to damage through inadvertent contact in normal use of the vehicle.

Electrical lead 142 from the second terminus 144 of conductive strip 136 can advantageously be provided in a single wiring bundle with electrical lead 132, until it separates to continue the series of electrical connections, by forming electrical connections with a conductive strip provided along the lower peripheral edge of the rear window (not shown) of the vehicle.

In the embodiment illustrated in FIG. 4, a fracture in the tempered glass of a vehicle window would result in an overall shattering of the window and a consequent loss in electrical continuity of the conductive strip provided along the lower edge of the window. As used here, the term "tempered glass" is used to mean any heat strengthened glass in which a break would typically result in fracturing beyond the immediate area of the breakage to the perimeter of the pane. Such loss of electrical continuity would be detected by security means 146 which has electrical power feed 148 from a vehicle battery or other power source. Security means 146 is adapted to respond upon detecting a loss of continuity, for example by actuating an audible alarm and/or a visual alarm. Preferably the security means includes a disabling means which, when actuated, prevents normal operation of the vehicle, permitting either limited or no vehicle operation. These and other alarm and disablement means are commercially available and will be readily apparent to those skilled in the art in view of the present disclosure.

In view of the foregoing disclosure and discussion of various preferred embodiments of the invention, those skilled in the art will readily perceive suitable modifications and alternative embodiments within the true scope and spirit of the invention. All such modifications and alternative embodiments are intended to be included within the scope of the appended claims.

We claim:

1. A motor vehicle glazing unit security system comprising:

multiple glazing units each mounted in a door and having a tempered glass pane movable between an open and a closed position and having an area hidden from view in both the open and closed position, and an electrically conductive strip of frangible cured metal particle-filled epoxy polymeric material self-adhered to a surface of the glass pane in the area hidden from view;

electrical connection means for electrically interconnecting the conductive strips; and security means electrically connected to the connection means for sensing and responding to a loss of electrical continuity of any of the conductive strips.

2. A motor vehicle glazing unit security system comprising:

multiple glazing units each mounted in a door and having a tempered glass pane movable between an open and a closed position and having an area hidden from view in both the open and closed position, and an electrically conductive strip of frangible cured polymeric material self-adhered to a surface of the glass pane in the area hidden from view, the polymeric material being electrically conductive ink;

electrical connection means for electrically interconnecting the conductive strips; and security means electrically connected to the connection means for sensing and responding to a loss of electrical continuity of any of the conductive strips.

3. A motor vehicle glazing unit security system comprising:

multiple glazing units each mounted in a door and having a tempered glass pane movable between an open and a closed position and having an area hidden from view in both the open and closed position, and an electrically conductive strip of frangible cured polymeric material self-adhered to a surface of the glass pane in the area hidden from view, wherein the conductive strip of each of the glazing units is formed of metal particle-filled epoxy polymeric material in a U-shaped path proximate a lower peripheral edge of the glass pane;

electrical connection means for electrically interconnecting the conductive strips; and security means electrically connected to the connection means for sensing and responding to a loss of electrical continuity of any of the conductive strips.

4. A method of forming a glazing unit for a motor vehicle security system, comprising applying a strip of electrically conductive, curable polymeric material to a surface of a tempered glass pane, attaching an electrical connector to the glass pane in electrical connection with the curable polymeric material, and then curing the curable polymeric material to form an electrically conductive strip self-adhered to the surface of the glass pane.

5. The method of claim 4 wherein the curing step comprises thermally curing the polymeric material.

6. The method of claim 5 wherein the curing step comprises exposing the polymeric material to UV light.

7. The method of claim 5 wherein the curable polymeric material is self-curing at ambient conditions.

8. The method of claim 5 wherein the curable polymeric material is applied to the surface of the glass pane by silk-screening.

9. The method of claim 5 wherein the curable polymeric material is applied to the surface of the glass pane from a nozzle travelling over the surface of the glass pane.

10. The method of claim 4 wherein the curable polymeric material is applied to the surface of the glass pane from a roller traveling over the surface of the glass pane.

11. A motor vehicle glazing unit security system comprising:

multiple glazing units including at least two which are mounted in a door of a motor vehicle and have a tempered glass pane moveable between an open position and a closed position, with an area hidden from view in both the open position and the closed position, and an electrically conductive strip of frangible polymeric material adhered to a surface of the glass pane in the area hidden from view;

electrical connection means for electrically interconnecting the conductive strips; and security means electrically connected to the connection means for sensing and responding to a loss of electrical continuity of any of the conductive strips.

12. The motor vehicle glazing unit security system of claim 11 wherein the electrically conductive strip follows a U-shaped path proximate a peripheral edge of the glass pane from a first electrical terminus to a second electrical terminus.

13. The motor vehicle glazing unit security system of claim 11 wherein a plurality of the conductive strips are in series connection with each other.

* * * * *